Patented June 20, 1950

2,511,867

UNITED STATES PATENT OFFICE 2,511,867

METHOD FOR SEPARATING ENANTIOMERS OF RACEMIC AMINO ACIDS

Carl Neuberg and Ines Mandl, New York, N. Y., assignors to Interchemical Corporation, New York, N. Y., a corporation of Ohio No Drawing. Application July 17, 1948, Serial No. 39,373

12 Claims. (Cl. 195—29)

This invention relates to a method of separating the two enantiomers of a racemic amino acid.

We have discovered a practical way of resolving racemic amino acids and of obtaining each of the optically active isomers uncontaminated by the other. In our method, we utilize enzymatic splitting of acyl amino acids.

It is known that by the action of the enzyme, hippuricase, hippuric acid (benzoyl amino acetic acid) is split into benzoic acid and amino acetic acid. In 1924 one of us published the observation made jointly with another (C. Neuberg and K. Linhardt, Biochm. Zeitschr. 147: 372-376) that benzoylated alanine (benzoyl amino propionic acid), which is similar to hippuric acid, could also be split by the action of the enzyme, hippuricase, and that the splitting appeared to follow a predominantly asymmetric course. The splitting action of the enzyme ceased in a short period of time and the method did not effect separation of the two isomers and was incapable of producing the d-isomer uncontaminated with the l-isomer.

We have now discovered a method of separating the isomers of racemic amino acids which is applicable generally to amino acids and which effects a complete separation so that the pure d-isomer as well as the pure l-isomer may be obtained. In our new method, an acyl amino acid is incubated with an amidase, and the acid released during the incubation is neutralized to maintain a constant pH value. When this is done, the splitting action of the amidase continues until the entire acyl-l-isomer of the amino acid is hydrolyzed into the acyl compound and the free l-amino acid. The unhydrolyzed portion of the acyl-amino acid and the amino acid portion from which the acyl compound has been split off are then separated by their differential solubility, thus completely separating the d and l-isomers.

The steps of our method are the following:

1. The racemic amino acid is reacted with an anhydride or acid chloride of a mono-carboxylic acid to give the amino acid in its acylated form.

It is most desirable to use the lower aliphatic acids such as formic and acetic acids in this step because the formyl and acetyl compounds of most amino acids may be produced easily by simply heating the amino acids with acetic anhydride or anhydrous formic acid, or a mixture of the two. Furthermore, the lower aliphatic acids provide acyl amino acid compounds which in general have high aqueous solubility which facilitates the forming of solutions appropriate for enzymatic cleavage. A still further advantage of using the lower aliphatic acids consists in their highly volatile nature which facilitates their removal after the enzymatic digestion has occurred. When the monocarboxylic acid used is one which cannot be reacted with the amino acid by simple heating, known methods of bringing about the reaction are used as indicated in the specific examples which follow.

2. A dilute solution of the acyl amino acid is prepared. Satisfactory results are obtained when the solution has a strength of from 1% to 2%. Water is used as the solvent in the case of acyl amino acids which are soluble in water. For those which are not, other solvents such as dilute methanol or ethanol are used.

3. One of the class of enzymes known as amidases is added to the solution. Such enzymes may be obtained either from animals or from plants. Amidase is present in pancreatin and also in the enzyme preparations from plants such as aspergillus oryzae. We have found it convenient to use commercial enzyme preparations containing amidase now marketed under various trade names such as "Clarase 900" (Takamine Laboratories), "Orthozym 10" (Rohm & Haas), "Takadiastase" (Parke, Davis & Co., Takamine Laboratories), "Crude Enzyme" (Takamine Laboratories), "Pilz-Protease" (Schweizerische Ferment A. G.), "Pancreatin" (Takamine Laboratories), "R and H 16" (Rohm & Haas), and others. Of these preparations, we find "Clarase 900" most desirable because its amidase activity is greater than that of the other preparations mentioned.

The amount of enzyme added to the solution is in excess of that necessary to split the acyl-l-isomer. In general, we have found it satisfactory to add an amount of an amidase preparation from one-fourth to equal the amount of acyl amino acid present in the solution but this may be varied without departing from our invention.

The solution is placed in condition for digestion by the enzyme. This involves bringing it to the temperature at which the enzyme is most active, adjusting its pH value to that at which the enzyme is most active, and protecting it against infection. The temperatures at which the various amidase preparations are to be heated are known. For most of the preparations mentioned, it is about 37° C. but for the last one mentioned it is 50° C. The pH value at which the various amidase preparations show optimum activity is known. For most of them it is a pH value of about 7, and for the last one named a pH value of 5-6. Protection against infection may be secured most easily by covering the solution with a layer of a non-volatile, aseptic liquid which is immiscible with the solution and has a lower specific gravity than the solution. Toluol is convenient for this purpose. Known means other than the use of a protective layer may be used to secure sterile conditions.

4. A vital feature of the invention consists in preventing decrease in the pH value of the solution by the acid liberated through the splitting action of the enzyme. In accordance with our invention, this result may be obtained in either one of two ways:

(a) When the initial pH adjustment is made by the addition of a soluble alkali, the pH value of samples taken from the solution from time to time is measured. On the basis of these measurements, additional soluble alkali sufficient to restore the pH to its initial value is added after the pH measurement of each sample.

(b) A more desirable method of maintaining the pH value consists in adding an alkaline buffer to the solution before or at the time the enzyme is added. The buffer consists of an excess of an alkaline compound which reacts with the acid in the solution to produce the desired pH value. When, as in the case of most amidases, the desired pH value is 7, a convenient material acting as a buffer consists of an excess of calcium carbonate, since a portion of this compound reacts with the acids to form soluble calcium salts having a pH value of 7, while the remainder stays undissolved in the solution ready to react with the acid liberated during the digestion.

5. The incubation coupled with maintaining the pH value constant is continued until the optical rotation of the solution becomes constant. Samples of the solution are taken from time to time during incubation. When each sample is taken, it is clarified and then placed in a polarimeter to determine its optical rotation. As soon as it is found that the optical rotation has become constant, the incubation may be stopped.

6. After digestion has been continued to a point where the optical rotation of the solution has become constant, the portion of the amino acid which is in acylated form and the portion which is in uncombined form are separated from one another by means of their differential solubilities. This is accomplished by extraction with a liquid in which the acyl amino acid is soluble and in which the free amino acid is not soluble, or vice versa, except in cases where the difference in solubility of the two portions in the solvent used for making the original solution is so great that one of the portions is precipitated at the end of the digestion, while the other portion remains in the solution. The amino acid may be purified to such extent as may be desired either before or after the acyl portion and the free portion are separated. In either case, it will be found on optical testing of the two portions that the portion in acylated form consists entirely of the d-isomer, while the portion in free form consists entirely of the l-isomer.

7. The purification of the amino acid from the reagents used in our method is, in accordance with our invention, most desirably effected as follows: The portion of the monocarboxylic acid used in the first step of the method which is split off during the digestion is eliminated by evaporation if the acid is volatile or by extraction if it is not volatile. The enzyme is precipitated by boiling the solution and it is then filtered out. In cases where one portion of the amino acid is precipitated in the solution during the incubation, the combined solids are filtered off and the amino acid portion is separated from the other solids by means of solvent extraction.

*Example I*

The racemic amino acid d,l-tryptophane is acetylated in known manner to form acetyl-d,l-tryptophane.

5 gr. of acetyl-d,l-tryptophane are dissolved in 300 cc. of water, the solution is warmed, and 2.5 gr. of calcium carbonate are added. Part of the calcium carbonate reacts to form the calcium salt of acetyl-d,l-tryptophane, and remains in solution giving the solution a pH value of 7. The remainder of the calcium carbonate remains undissolved and serves as a buffer during the subsequent digestion.

The volume of the solution is adjusted to 400 cc. To the solution, at a temperature of about 40° C., there is added 3 gr. of "Orthozym 10," an amidase containing preparation of Rohm & Haas, made from bacteria cultures. The batch is then covered with a layer of toluol in order to prevent infection, and is incubated at 37° C. The acid released during the incubation by the splitting action of the enzyme is neutralized by the undissolved calcium carbonate so that the pH value of the solution is maintained at 7 during the incubation.

The incubation is continued until the optical rotation of the solution becomes constant. To determine this point, samples are taken from the solution from time to time and examined in a polarimeter after filtering and clarifying with filter cel or activated charcoal. Adsorption of the amino acid by the charcoal is prevented by the addition of a few drops of acetone. After the time for incubation has been determined in this manner on the first batch, the same time for incubation may be used on later batches consisting of the same materials. The incubation time with "Orthozym 10" has been found to be about 10 days.

After the optical rotation of the solution has become constant, the solution is freed of the enzyme and the calcium carbonate. The enzyme is coagulated by boiling the solution and the coagulated enzyme and the undissolved calcium carbonate are removed by filtration. Dissolved calcium carbonate is eliminated by the addition of sufficient oxalic acid to balance the calcium ions, and the precipitated calcium oxalate is filtered out.

The acetic acid released during the incubation is then removed by volatilization. This is done by evaporating the solution to dryness, most desirably in vacuo at 40° C.

The dry residue is extracted with a solvent for acetyl tryptophane which is not a solvent for uncombined tryptophane. The extraction is effected by boiling under reflux three times with 150 cc. of acetone or ethyl acetate. The acetone or ethyl acetate is evaporated to obtain the acetyl tryptophane dissolved therein. Recrystallization from the dilute solvent produces pure white acetyl tryptophane which shows an optical rotation of $(\alpha)_D = -260°$ (in methanol), indicating that it consists entirely of the d-enantiomer. The yield exceeds 90% of the theoretical.

The dry product remaining after the extraction, that is, the portion insoluble in acetone or ethyl acetate, consists of free tryptophane which, after purification in known manner, has an optical rotation of $(\alpha)_D = -32°$ C. (in water), showing that it consists entirely of the l-enantiomer. The yield is 85% of the theoretical.

Example II d,l-methionine is benzoylated in the known manner to form benzoyl-d,l-methionine.

5 gr. of benzoyl-d,l-methionine are dissolved in 300 cc. of water, the solution is warmed, and 2.5 gr. of calcium carbonate are added.

The volume of the solution is adjusted to 400 cc. To the solution, at a temperature of about 40° C., there is added 4.0 gr. of "Takadiastase," an enzyme preparation of Parke, Davis & Co. or of Takamine Laboratories, which has amidase activity. The batch is then covered with a layer of toluol in order to prevent infection, and is incubated at 37° C. The incubation is continued until the optical rotation of the solution becomes constant which takes from 7 to 10 days depending upon the enzyme preparation. The steps, at the end of the incubation period, of removing the enzyme and the calcium and of evaporating the liquid to dryness, are identical with those of Example I. The residue is then boiled under reflux with petroleum ether to extract the benzoic acid liberated during the digestion. The residue after the petroleum ether extraction is boiled under reflux three times with 150 cc. of acetone or ethyl acetate. Benzoyl methionine is recovered by evaporating the solvent. Recrystallization from dilute ethanol produces pure benzoyl methionine which shows an optical rotation of $(\alpha)_D = +19°$, indicating that it consists entirely of the d-enantiomer.

The dry product remaining after the extraction, that is, the portion insoluble in acetone or ethyl acetate, consists of free methionine which, after purification in the known manner, has an optical rotation of $(\alpha)_D = -6°$, showing that it consists entirely of the l-enantiomer.

The yield of the two enantiomers is approximately 80% of the theoretical. Still higher yields will doubtless be obtainable on a large scale.

Example III

The formyl derivative of d,l-phenylalanine is made according to the method of du Vignaud & Mayer (Jour. Biol. Chem., 48, 302, 1932).

5 gr. of formyl-d,l-phenylalanine are prepared for the incubation in the manner disclosed in Example I, except that "Clarase 900" of Takamine Laboratories is used as the enzyme preparation instead of "Orthozym 10."

The initial optical rotation is $-0.6°$ Ventzke. The optical rotation changes to $-2°$, $-2.5°$ and $-3°$ on the 2nd, 3rd, and 4th day, respectively, and remains constant at $-3°$ after four days of incubation. After the incubation the solution is freed of the enzyme and the calcium in the manner as indicated in Example I. The formic acid released during incubation is removed by evaporating the solution to dryness, preferably in vacuo at 40° C.

The residue remaining after the vacuum evaporation is extracted with ethanol, which is the most desirable solvent for the separation of formyl phenylalanine from free phenylalanine. The ethanol extract is then evaporated to leave a product which, without further purification, shows an optical rotation of $(\alpha)_D = -76°$ (in ethanol), indicating that it consists entirely of formyl-d-phenylalanine. The recovery is practically quantitative.

The portion insoluble in ethanol consists of uncombined phenylalanine. It shows, after purification, an optical rotation of $(\alpha)_D = -34°$, the rotation of pure l-phenylalanine. The yield exceeds 80% of the theoretical.

Example IV

The formyl derivative of d,l-tryptophane is produced by means of the method used in Example III, except that it is obtained by evaporation and drying in vacuo, since it does not crystallize directly.

5 gr. of formyl-d,l-tryptophane are prepared for incubation in the same manner as illustrated in Example II, only that the amount of "Takadiastase" is reduced from 5 gr. to 1 gr. After the optical rotation is constant, the solution is freed of the enzyme and the calcium as indicated in Example I and the formic acid present is removed by evaporating to dryness.

The residue is treated with acetone in order to separate the free tryptophane fraction from the unhydrolyzed formyl tryptophane. Pure formyl-d-tryptophane is obtained from the acetone fraction in the theoretical amount.

The residue is taken up with water whereby some tryptophane crystallizes out directly. The balance is recovered in the known manner by way of the copper salt. The total yield is 90% of the theoretical, the optical rotation is $(\alpha)_D = -32°$, indicating pure l-tryptophane.

Example V d,l-phenylalanine is acylated with phenylacetyl chloride by known methods. 4 gr. of the phenylacetyl-d,l-phenylalanine are dissolved in hot water, 2.5 gr. calcium carbonate are added and the volume is adjusted to 400 cc. After cooling to about 37° C. and the addition of 2 gr. "Orthozym 10" and some toluol, the sample is incubated at 37° C. After the optical rotation is constant, the procedure of Example III is used for the removal of the phenylacetic acid liberated during the incubation and for the separation of the phenylacetyl phenylalanine fraction from the uncombined phenylalanine. The pure optical isomers are obtained in yields exceeding 80%.

Example VI

The formyl derivative of d,l-isoleucine is prepared according to Fischer & Warburg (Ber. 38, 3997, 1905).

11 gr. of formyl-d,l-isoleucine are dissolved in 1000 cc. of hot water. 9 gr. of calcium carbonate are added, and the solution is cooled to 37° C. The precipitation of some of the sparingly soluble calcium salt of formyl-d,l-isoleucine which occurs upon cooling does not impair the enzymatic digestion. After adding 3 gr. of "Takadiastase" (Parke, Davis & Co.), the batch is incubated at 37° C. for 5 days. On the fifth day, another 0.5 gr. portion of the enzyme preparation is added and the digestion is continued until the optical rotation becomes constant.

After elimination of the enzyme and of excess calcium and calcium ions and after evaporating to dryness in the manner as described in Example I, the residue is boiled three times under reflux with 300 cc. of acetone. Formylisoleucine goes thereby in solution, but also some of the uncombined isoleucine. In order to accomplish a clear cut separation of the two, petroleum ether is added to the acetone extract in an amount equal to 10 per cent by volume of the acetone. The extract is left standing in the cold for several hours. The free isoleucine portion contained in the extract precipitates and is separated and combined with the main portion, i. e. the acetone insoluble fraction.

The isoleucine is dissolved in hot water and the solution concentrated by boiling. Part of the isoleucine crystallizes out thereby, in such purity that no decoloration is required. The portion remaining in the mother liquor is separated and purified by known means. The yield of the combined product amounts to 82% of the theoretical. The optical rotation $(\alpha)_D = +37.5°$ (in 20% HCl), indicating pure l-isoleucine.

Example VII d,l-methionine is acetylated according to the directions of Kolb & Toennis (Jour. Biol. Chem., 144, 199, 1942).

5 gr. of the product are treated in the manner described in Example I. The residue remaining after vacuum evaporation is extracted with acetone to remove the acetyl methionine fraction. It is recovered from the acetone solution by known means and is identified as pure acetyl-d-methionine.

The acetone insoluble fraction is extracted with water and the extract then partly evaporated. The sparingly soluble free methionine which crystallizes thereby directly from the aqueous solution proves to consist entirely of l-methionine.

Example VIII d,l-aspartic acid is benzoylated according to the directions of Michael & Wing (Ber. 17, 2984, 1884).

5 gr. of the product are digested with "Takadiastase" as in Example II. After an incubation of about 11 days the optical rotation is constant. The batch is then further treated as indicated in Example II. The acetone or ethyl acetate extract which is obtained thereby is evaporated to dryness. It yields almost exactly one-half of the original amount of benzoyl aspartic acid. After two recrystallizations from hot water the product shows a specific rotation of $(\alpha)_D = -37°$ (in N KOH) and a melting point of 180° C., indicating that it consists entirely of benzoyl-d-aspartic acid.

The fraction which is insoluble in the acetone or the ethyl acetate consists of an equivalent amount of uncombined aspartic acid. After purification by known means this fraction shows a specific rotation of $(\alpha)_D = -2°$ (in N NaOH), indicating pure l-aspartic acid.

Example IX

Free d,l-lysine is prepared from d,l-lysine hydrochloride by known means and changed into dibenzoyl-d,l-lysine according to the method of Fischer & Weigert (Ber. 35, 3772, 1902). The dibenzoyl-d,l-lysine is then treated with hydrochloric acid in order to convert it into N-monobenzoyl-d,l-lysine.

5 gr. of N-monobenzoyl-d,l-lysine are digested as illustrated in Example II. The residue obtained after the extraction of the benzoic acid liberated during the digestion consists of N-monobenzoyl lysine and of free lysine. The residue is repeatedly boiled with ethanol whereby the N-monobenzoyl lysine goes in solution and the free lysine is left undissolved. By means of known methods of preparation the free lysine is changed into lysine hydrochloride which shows an optical rotation of $(\alpha)_D = -20.2°$ (in N HCl), indicating that it consists of the pure l-isomer.

The ethanol extracts are combined and evaporated, giving monobenzoyl d-lysine at a yield of practically 50% of the original amount of monobenzoyl lysine. The product is hydrolyzed with hydrochloric acid to obtain pure d-lysine hydrochloride.

Example X

Lauryl-d,l-alanine is prepared according to Bondi (Biochem. Z. 17, 543) from lauryl chloride and d,l-alanine.

5 gr. lauryl-d,l-alanine are dissolved in an amount of methanol which is just sufficient to produce complete dissolution and the volume of the solution is adjusted with water to 400 cc. To the solution is added 3 gr. of calcium carbonate, 3 gr. of "Takadiastase" and some toluol and the batch is then incubated at 37° C. and shaken from time to time. After the optical rotation has become constant the solution is boiled and filtered in order to separate the excess calcium carbonate, the enzyme, and a precipitate which formed during the incubation. The separated material is partly dried, acidified to Congo red with dilute hydrochloric acid and extracted by shaking with acetone containing ether. On evaporation of the extract an oil remains behind which changes to a semi-solid after standing in the cold. Recrystallization from hot benzol and petroleum ether produces pure lauryl-d-alanine, having a melting point of 102–103° C. and an optical rotation of $(\alpha)_D = +4°$ (in ethanol). The yield is 85% of the theoretical.

The filtrate is treated with oxalic acid to remove the calcium ions and is then extracted twice with ether in order to remove small amounts of lauryl-d-alanine. It is then evaporated to dryness. The residue shows an optical rotation of $(\alpha)_D = -14.2°$ (in HCl), indicating that it consists entirely of l-alanine. The yield is 90% of the theoretical.

Example XI

Palmityl-d,l-alanine is prepared from palmityl chloride and d,l-alanine according to Bondi and Frankl (Bioch. Z. 17, 553).

5 gr. of palmityl-d,l-alanine are treated in the manner disclosed in Example X, except that the precipitate obtained after boiling and filtration is extracted by shaking with chloroform. On evaporation of the chloroform extract palmityl-d-alanine is obtained at a yield exceeding 90% of the theoretical. The optical rotation of the product without further purification is $(\alpha)_D = +6°$ (in ethanol).

The l-alanine which is obtained from the filtrate in the manner as described in Example X has an optical rotation of $(\alpha)_D = +14.2°$ (in HCl). The yield is 90% of the theoretical.

Example XII 5 gr. of the acetyl-d,l-tryptophane used in Example I are dissolved in 400 cc. of water. The solution which is slightly more acid is adjusted to pH 6 with ammonia. 3 gr. of "R and H 16," an enzyme preparation of Rohm & Haas, are then added. The batch is covered with a layer of toluol in order to prevent infection and is incubated at 50° C. A sample is taken every 12 hours and when the sample indicates that the pH has dropped to 5 or close to 5, the pH of the batch is readjusted to the original value by adding ammonia.

The incubation is continued until the optical rotation of the solution becomes constant. After the rotation has become constant the enzyme is coagulated by heating the solution and is removed by filtration. The filtrate is then evaporated to dryness, preferably in vacuo, and the dry residue is extracted with acetone or ether, as illustrated in Example I, in order to separate the d-enantiomer in form of acetyl tryptophane from the free l-tryptophane. The yields are of the same order as those indicated in Example I.

*Example XIII*

Chloroacetyl-d,l-tyrosine is prepared by treating d,l-tyrosine with chloroacetyl chloride according to the directions of Fischer (Ber. 37, 2494, 1904).

5 gr. of chloroacetyl-d,l-tyrosine are dissolved in 300 cc. of water. To the solution is added 2.5 gr. calcium carbonate, 3 gr. "Clarase 900" and some toluol. The volume is then adjusted to 400 cc. and the batch incubated at 37° C. After a short period of incubation, the formation of a crystalline precipitate is visible beside the excess calcium carbonate. After 6 days of incubation the optical rotation is constant and the precipitate is separated from the liquid and treated with dilute acetic acid in order to dissolve the calcium carbonate. The remaining solids are separated and washed. They consist of l-tyrosine showing an optical rotation of $(a)_D = -10°$ (in N HCl).

The filtrate is boiled in order to coagulate and to remove the enzyme. It is freed of calcium ions by means of exactly balanced amounts of oxalic acid and is then evaporated in vacuo. Additional small amounts of l-tyrosine crystallize from the solution during the evaporation. They are removed and added to the main portion. The evaporation is continued to dryness and the residue then extracted with hot acetone. The product obtained from the acetone extract is recrystallized from hot water. It shows an optical rotation of $(a)_D = -25°$ (in $H_2O$), indicating that it consists entirely of chloroacetyl-d-tyrosine. The yield is 85% of the theoretical.

We claim:

1. The method of separating the two enantiomers of a racemic amino acid, which comprises acylating the racemic amino acid with a monocarboxylic acid residue, dissolving the resulting acyl amino acid in an excess of solvent, adding amidase to the solution, adjusting the pH of the solution to the optimum value for the action of the amidase, aseptically incubating the solution at the optimum temperature for the action of the amidase, neutralizing the acid released during incubation to maintain the pH value of the solution constant, continuing the incubation and the neutralizing until the optical rotation of the solution becomes constant, and thereafter separating the portion of the amino acid in free form and the portion in acyl form from each other whereby separation of the two enantiomers is effected, the d-enantiomer constituting the acyl portion and the l-enantiomer constituting the free portion.

2. The method of separating the two enantiomers of a racemic amino acid, which comprises reacting the racemic amino acid with acetyl chloride, dissolving the resulting acetyl amino acid in an excess of solvent, adding amidase to the solution, adjusting the pH of the solution to the optimum value for the action of the amidase, aseptically incubating the solution at the optimum temperature for the action of the amidase, neutralizing the acid released during incubation to maintain the pH value of the solution constant, continuing the incubation and the neutralizing until the optical rotation of the solution becomes constant, and thereafter separating the portion of the amino acid in free form and the portion in acetyl form from each other whereby separation of the two enantiomers is effected, the d-enantiomer constituting the acetyl portion and the l-enantiomer constituting the free portion.

3. The method of separating the two enantiomers of a racemic amino acid, which comprises reacting the racemic amino acid with phenylacetyl chloride, dissolving the resulting phenylacetyl amino acid in an excess of solvent, adding amidase to the solution, adjusting the pH of the solution to the optimum value for the action of the amidase, aseptically incubating the solution at the optimum temperature for the action of the amidase, neutralizing the acid released during incubation to maintain the pH value of the solution constant, continuing the incubation and the neutralizing until the optical rotation of the solution becomes constant, and thereafter separating the portion of the amino acid in free form and the portion in phenylacetyl form from each other whereby separation of the two enantiomers is effected, the d-enantiomer constituting the phenylacetyl portion and the l-enantiomer constituting the free portion.

4. The method of separating the two enantiomers of a racemic amino acid, which comprises reacting the racemic amino acid with benzoyl chloride, dissolving the resulting benzoyl amino acid in an excess of solvent, adding amidase to the solution, adjusting the pH of the solution to the optimum value for the action of the amidase, aseptically incubating the solution at the optimum temperature for the action of the amidase, neutralizing the acid released during incubation to maintain the pH value of the solution constant, continuing the incubation and the neutralizing until the optical rotation of the solution becomes constant, and thereafter separating the portion of the amino acid in free form and the portion in benzoyl form from each other whereby separation of the two enantiomers is effected, the d-enantiomer constituting the benzoyl portion and the l-enantiomer constituting the free portion.

5. The method of separating the two enantiomers of d,l-tryptophane which comprises reacting d,l-tryptophane with acetyl chloride, dissolving the resulting acetyl-d,l-tryptophane in an excess of water, adding amidase to the solution, adjusting the pH of the solution to the optimum value for the action of the amidase, aseptically incubating the solution at the optimum temperature for the action of the amidase, neutralizing the acetic acid released during incubation to maintain the pH value of the solution constant, continuing the incubation and the neutralizing until the optical rotation of the solution becomes constant, and thereafter separating the portion of the tryptophane in free form and the portion in acetyl form from each other whereby separation of the two enantiomers is effected, the d-tryptophane constituting the acetyl portion and the l-tryptophane constituting the free portion.

6. The method of separating the two enantiomers of d,l-phenylalanine which comprises reacting d,l-phenylalanine with phenylacetyl chloride, dissolving the resulting phenylacetyl-d,l-phenylalanine in an excess of water, adding amidase to the solution, adjusting the pH of the solution to the optimum value for the action of the amidase, aseptically incubating the solution at the optimum temperature for the action of the amidase, neutralizing the phenylacetic acid released during incubation to maintain the pH value of the solution constant, continuing the incubation and the neutralizing until the optical rotation of the solution becomes constant, and thereafter separating the portion of the amino acid in free form and the portion in phenylacetyl form from each other whereby separation of the two enantiomers is effected, the d-phenylalanine constituting the phenylacetyl portion and the l-phenylalanine constituting the free portion.

7. The method of separating the two enantiomers of d,l-lysine which comprises preparing N-monobenzoyl-d,l-lysine, dissolving said monobenzoyl-d,l-lysine in an excess of water, adding amidase to the solution, adjusting the pH of the solution to the optimum value for the action of the amidase, aseptically incubating the solution at the optimum temperature for the action of the amidase, neutralizing the benzoic acid released during incubation to maintain the pH value of the solution constant, continuing the incubation and the neutralizing until the optical rotation of the solution becomes constant, and thereafter separating the portion of the lysine in free form and the portion in monobenzoyl form from each other whereby separation of the two enantiomers is effected, the d-lysine constituting the monobenzoyl portion and the l-lysine constituting the free portion.

8. The method of separating the two enantiometers of d,l-tryptophane, which comprises reacting d,l-tryptophane with acetic anhydride, dissolving the resulting acetyl-d,l-tryptophane in an excess of water, adding amidase from aspergillus oryzae to the solution, adjusting the pH of the solution to pH 7, aseptically incubating the solution at 37° C. neutralizing the acetic acid released during incubation to maintain the pH value of the solution at 7, continuing the incubation and the neutralizing until the optical rotation of the solution becomes constant, and thereafter separating the portion of the tryptophane in free form and the portion in acetyl form from each other whereby separation of the two enantiomers is effected, the d-tryptophane constituting the acetyl portion and the l-tryptophane constituting the free portion.

9. The method of separating the two enantiomers of d,l-tryptophane, which comprises reacting d,l-tryptophane with acetic anhydride, dissolving the resulting acetyl-d,l-tryptophane in an excess of water, adding amidase from aspergillus oryzae, adding an excess of calcium carbonate, aseptically incubating the solution at 37° C., continuing the incubation until the optical rotation of the solution becomes constant, boiling, removing excess calcium carbonate and coagulated enzyme, removing calcium ions with oxalic acid, evaporating to dryness and extracting the residue with acetone whereby separation of the two enantiometers is effected, the d-tryptophane constituting the acetyl portion which is soluble in acetone and the l-tryptophane constituting the free portion which is insoluble in acetone.

10. The method of separating the two enantiomers of d,l-lysine which comprises preparing N-monobenzoyl-d,l-lysine, dissolving said monobenzoyl-d,l-lysine in an excess of water, adding amidase from aspergillus oryzae, adding an excess of calcium carbonate, aseptically incubating the solution at 37° C., continuing the incubation until the optical rotation of the solution becomes constant, boiling, removing calcium carbonate and coagulated enzyme, removing calcium ions with oxalic acid, evaporating in vacuo to dryness, extracting benzoic acid with petroleum ether, and extracting the residue with ethyl alcohol whereby separation of the two enantiomers is effected, the d-lysine constituting the benzoyl portion which is soluble in ethyl alcohol and the l-lysine constituting the free portion which is insoluble in ethyl alcohol.

11. The method of separating the two enantiomers of a racemic amino acid, which comprises acylating the racemic amino acid with a monocarboxylic acid residue, dissolving the resulting acyl amino acid in an excess of solvent, adding amidase having an optimum pH 5 to 6, adjusting the pH of the solution to the optimum value for the action of the amidase, aseptically incubating the solution at the optimum temperature for the action of the amidase, neutralizing the acid released during incubation to maintain the pH value of the solution constant, continuing the incubation and the neutralizing until the optical rotation of the solution becomes constant, and thereafter separating the portion of the amino acid in free form and the portion in acyl form from each other whereby separation of the two enantiomers is effected, the d-enantiomer constituting the acyl portion and the l-enantiomer constituting the free portion.

12. The method of separating the two enantiomers of a racemic amino acid, which comprises acylating the racemic amino acid with a monocarboxylic acid residue, dissolving the resulting acyl amino acid in an excess of solvent, adding amidase to the solution, adjusting the pH of the solution with ammonia to the optimum value for the action of the amidase, aseptically incubating the solution at the optimum temperature for the action of the amidase, neutralizing the acid released during incubation with ammonia to maintain the pH value of the solution constant, continuing the incubation and the neutralizing until the optical rotation of the solution becomes constant, and thereafter separating the portion of the amino acid in free form and the portion in acyl form from each other whereby separation of the two enantiomers is effected, the d-enantiomer constituting the acyl portion and the l-enantiomer constituting the free portion.

CARL NEUBERG.
INES MANDL.

REFERENCES CITED

The following references are of record in the file of this patent:

C. Neuberg et al., Biochm. Zeitschr. 147: 372-376.